Sept. 12, 1944.  J. M. ANDREAS  2,357,924
COLOR PHOTOGRAPHY
Filed Feb. 20, 1941
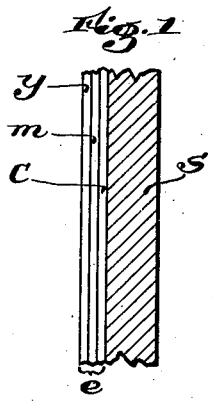
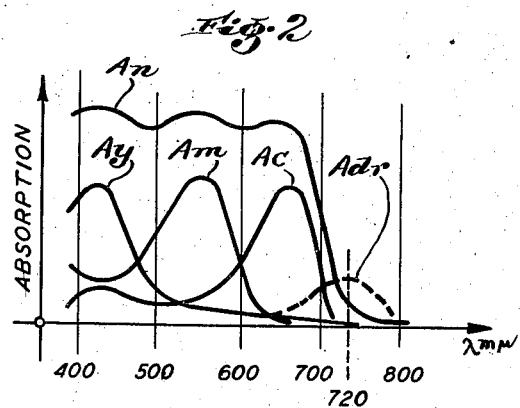
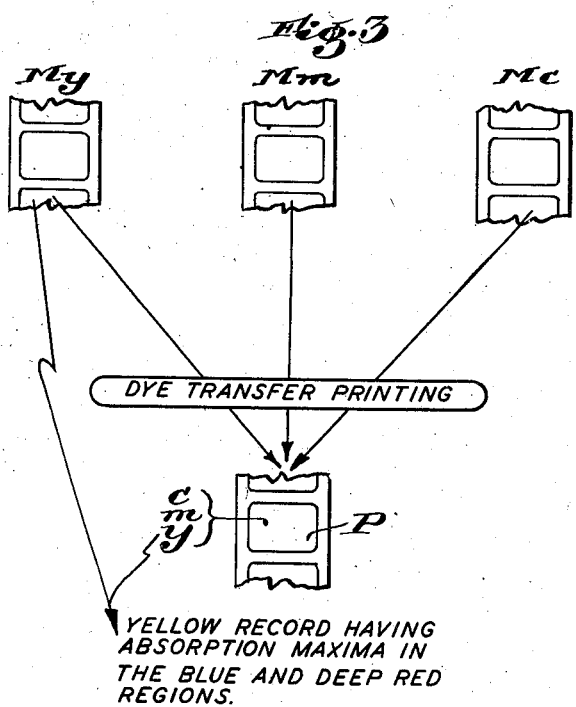
YELLOW RECORD HAVING ABSORPTION MAXIMA IN THE BLUE AND DEEP RED REGIONS.
Inventor
John M. Andreas
by Roberts, Cushman & Woodbury
his Attys.

Patented Sept. 12, 1944

2,357,924

UNITED STATES PATENT OFFICE 2,357,924

COLOR PHOTOGRAPHY

John M. Andreas, Hollywood, Calif., assignor to Technicolor Motion Picture Corporation, Hollywood, Calif., a corporation of Maine Application February 20, 1941, Serial No. 379,771

9 Claims. (Cl. 95—2)

This invention relates to color photography and more particularly to photographic records composed of two or more superposed color aspect records in subtractive colors.

Some of the subtractive coloring matters commercially available for making color photographs are deficient because their spectral absorption bands do not have the shape or location required by the reproduction process in which they are employed. Referring for example to three-color photography by the imbibition method according to which color aspect records in subtractive dyes are transferred in superposition to a blank film from matrix films, many of the available cyan dyes do not have sufficiently strong absorption for light at the far red end of the visible spectrum. As a consequence of this defect, blue colors may appear too violet in hue and shadows may be either insufficiently dense or too red.

It is the main object of the present invention to reduce this excessive transmission (or reflectance, in the case of reproductions intended to be viewed by reflected light) of certain spectral ranges by photographic color records in subtractive coloring matters. In one aspect, the invention provides an improved method for making color photographic records of this type using coloring matters of particular characteristics; in another aspect, the invention provides improved records of this type by reproducing the blue aspect in yellow coloring matter which absorbs a certain portion of the red range of the visible spectrum; in still another aspect, the invention provides coloring matter of this type which has satisfactory transfer properties if used to reproduce color aspect records by the imbibition method.

These and other objects and aspects of the invention will be apparent from the following description of a practical embodiment illustrating its general characteristics. This description refers to a drawing in which:

Fig. 1 is a schematic section through a three color photographic record;

Fig. 2 is a digrammatic representation of dye absorption characteristics according to the invention; and Fig. 3 is a flow diagram explaining a printing method according to the invention.

As indicated in Fig. 1, a photographic color record of the subtractive type may consist of a support S, for example a transparent Celluloid film, and a gelatin coating $e$ carrying three records, $y$, $m$ and $c$, of the blue, green and red color aspects respectively, which records are printed or otherwise produced in yellow (blue absorbing), magenta (green absorbing) and cyan (red absorbing) coloring matters. These coloring matters will in most instances be dyes, but it is understood that other coloring matters having similar optical characteristics may serve the same purpose; therefore, the term "dye" will herein be used to denote any such coloring matter.

These three records (in yellow, magneta and cyan dyes, respectively) may be applied to a single gelatin coating by transferring them in exact superposition to this coating from three gelatin matrices. In this case, the three subtractive dye records practically merge in the gelatin coating $e$.

The subtractive color records may also be provided in the form of so-called integral packs. In this case, three distinct emulsion layers may contain records in yellow, magenta and cyan dyes, respectively. At the present time, such records are preferably produced in their respective layers by color development processes which, under the control of developed or undeveloped negative or positive silver halide records, supply dye records in the subtractive colors, yellow, magenta and cyan.

It is further feasible to combine various methods of subtractive color photography, for example by transferring a yellow dye record to an integral pack emulsion containing the magenta and cyan records.

As mentioned above, the commercially available dyes, or the dyes for various reasons preferable for this purpose, are deficient because their absorption ranges do not extend over the entire spectral range which they should theoretically suppress. The cyan dyes are particularly deficient in this respect since their absorption bands frequently do not cover the range of longer wave lengths towards the far red end of the visible spectrum, which range will herein be referred to as "deep red."

This condition is indicated in Fig. 2, where $Ay$, $Am$ and $Ac$ are the absorption curves of a set of yellow, magenta and cyan dyes, and where $An$ is the combined or neutral absorption curve. It will be apparent from this diagram that it will not only be very difficult to obtain neutral black shadows of high density—since the usual yellow and magenta dye have essentially no absorption in the deep red and even the cyan is deficient in this region—but also that the hues of certain colors in the original will be reproduced incorrectly. A most objectionable result of this condition is a tendency of the shadow portions of the reproduction to appear brownish or dull red.

I have found that this undesirable transmission of the deep red by certain parts of the final picture can be greatly reduced by providing the yellow record (y of Fig. 1) with an additional absorption band in the deep red region, the added absorption maximum being preferably in the region 690–730 millimicrons, either by using coloring matter having this peculiar absorption characteristic or by combining coloring matters to furnish the same result. This is indicated at Adr of Fig. 2.

In the latter instance, which leaves considerably more latitude in the selection of materials to produce the required result, I found that the blue and deep red, respectively, absorbing components (each of which may again be composed of several dyes) of the imbibition dye for the blue aspect record can be selected so that the ratio of red absorbing dye to blue absorbing dye in the shadows of the "yellow" record can be made either greater than, equal to or less than the ratio of the same dyes in the highlight portions of the same record. The particular effect which is most desirable and the most suitable combination of dyes to produce it will depend upon the characteristics of the other records of the color reproduction process with which this new type of yellow record is to be employed.

It should be noted in this connection that the dye which has an absorption band in the deep red may also have an absorption band in the blue region. If it does have an absorption band in the blue region, it will have the general appearance of a green or olive color. Such a dye cannot be added to either the magenta or cyan records, because it would degrade the rendition of blue colors, but it can be used to advantage in the yellow record.

With reference to Fig. 3, the essential steps of an actually used reproduction technic incorporating the invention will now be described by way of example. In this figure, My, Mm and Mc represent three gelatin matrices made in the conventional manner by exposing three matrix films through their supports to three color separation records, hardening the gelatin coextensive with the exposed silver halide and removing the unexposed portions. The gelatin of these relief matrices is loaded with the appropriate dyes, the cyan printing matrix with conventional cyan dye having its maximum absorption of about 650 millimicrons, the magenta printing matrix with dye having its maximum absorption at about 535 millimicrons, and the yellow printing matrix with dye from an aqueous solution having the following composition:

Brilliant Paper Yellow Conc. (DuP) (C. I. 364) _____ grams/liter__ 3.0
Naphthol Green B Conc. (DuP) (C. I. 5) _____ gram/liter__ 1.0
Glacial acetic acid _____ per cent__ 3.0

This dye mixture has the desired characteristic of providing absorption maxima in the blue and deep red spectral regions, and the dyes transfer in such a way that relatively more green is present in the shadows than in the highlights of the yellow record.

These three matrices are then consecutively, in exact register, brought into contact with the gelatin layer of the positive blank film P producing therein a three-color record in subtractive dyes, with the transmission of the deep red region reduced to a degree essentially eliminating the above-mentioned disadvantages and yet not unfavorably disturbing the general color rendition.

It will be understood that, instead of applying the two dyes as a mixture, they could be separately applied in consecutive printing operations.

It will also be understood that the use of this deep red absorbing dye in the picture area might be only one of several functions which the dye performs. For example, in making motion picture sound film, the deep red absorbing dye may be employed for making frame lines or sound track or both in addition to being an important factor in producing improved color reproduction in the picture area.

It will be further understood that the invention can be analogously applied to other types of subtractive color reproduction processes. In the instance of color developed integral monopacks for example, the layer to which the compensating function is allotted will be developed to produce a dye image having the desired absorption, for example by initially incorporating in the blue aspect layer or in its developing solution two color formers which, as the development of the silver record proceeds, produce a record in two dyes, one absorbing mainly the blue and the other the deep red spectral region.

It should be understood that the present disclosure is for the purpose of illustration only and that this invention includes all modifications and equivalents which fall within the scope of the appended claims.

I claim:

1. In the art of making colored photographic records comprised of superposed records of the blue, green and red color aspects in the subtractive coloring matters yellow, magenta and cyan, the cyan coloring matter not having sufficiently strong absorption for light at the far red end of the spectrum and thus causing a preponderance of red in the finished record, the method comprising printing said records magenta and cyan in registered superposition by dye transfer from matrices, and similarly printing the record yellow in a mixture of two dye components, one component absorbing the blue spectral range and the other component the deep red range and the ratio of said two components present in all densities of the record being approximately constant, in amount sufficient substantially to reduce said preponderance of red in the finished record.

2. In the art of making colored photographic records comprised of superposed records of the blue, green and red color aspects in the subtractive coloring matters yellow, magenta and cyan, the cyan coloring matter not having sufficiently strong absorption for light at the far red end of the spectrum and thus causing a preponderance of red in the finished record, the method comprising printing said records magenta and cyan in registered superposition by dye transfer from matrices, and similarly printing the record yellow in a mixture of two dye components, one component absorbing the blue spectral range and the other component the deep red range, relatively more of the deep red absorbing component being present in the highlights than in the shadows of the blue aspect record, in amount sufficient substantially to reduce said preponderance of red in the finished record.

3. In the art of making colored photographic records comprised of superposed records of the blue, green and red color aspects in the subtractive coloring matters yellow, magenta and cyan, the cyan coloring matter not having sufficiently strong absorption for light at the far red end of the spectrum and thus causing a preponderance of red in the finished record, the method comprising printing said records magenta and cyan in registered superposition by dye transfer from matrices, and similarly printing the record yellow in a mixture of two dye components, one component absorbing the blue spectral range and the other component the deep red range, relatively less of the deep red absorbing component being present in the highlights than in the shadows of the blue aspect record, in amount sufficient substantially to reduce said preponderance of red in the finished record.

4. A colored photographic record comprising a support carrying in registered superposition two records absorbing the green and red spectral ranges respectively and transmitting the deep red spectral range, and a third record having an absorption maximum in the blue spectral range and another absorption maximum in said deep red spectral range, whereby the third record has maximum absorption at opposite ends of the spectrum and the absorption of the first two records is confined substantially to intermediate ranges.

5. A colored photographic record comprising a support carrying in registered superposition two records absorbing the green and red spectral ranges respectively and transmitting the deep red spectral range, and a third record comprising two dye components, one component having an absorption maximum in the blue spectral range and the other dye component having an absorption maximum in said deep red spectral range, whereby the third record has maximum absorption at opposite ends of the spectrum and the absorption of the first two records is confined substantially to intermediate ranges.

6. A colored photographic record according to claim 5 further characterized in that the ratio of the first component to the second component is greater in the high lights than in the shadows.

7. A colored photographic record according to claim 4 further characterized in that said third record comprises naphthol green dye.

8. A colored photographic record according to claim 4 further characterized in that said third record comprises brilliant yellow dye and naphthol green dye.

9. In the art of making colored photographic records comprised of superposed records of the blue, green and red color aspects in the subtractive coloring matters yellow, magenta and cyan, the cyan coloring matter not having sufficiently strong absorption for light at the far red end of the spectrum and thus causing a preponderance of red in the finished record, the method comprising printing said records magenta and cyan in registered superposition by dye transfer from matrices, and similarly printing the record yellow in a mixture of two dye components, one component absorbing the blue spectral range and the other component the deep red range in amount sufficient substantially to reduce said preponderance of red in the finished record.

JOHN M. ANDREAS.